(12) United States Patent
Hu et al.

(10) Patent No.: US 11,974,324 B2
(45) Date of Patent: Apr. 30, 2024

(54) TWO-STEP RANDOM ACCESS PROCEDURE IN WIRELESS SYSTEMS

(71) Applicant: ZTE Corporation, Guangdong (CN)

(72) Inventors: Yuzhou Hu, Guangdong (CN); Zhifeng Yuan, Guangdong (CN); Weimin Li, Guangdong (CN); Hong Tang, Guangdong (CN); Jian Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 334 days.

(21) Appl. No.: 17/373,008

(22) Filed: Jul. 12, 2021

(65) Prior Publication Data
US 2021/0345416 A1 Nov. 4, 2021

Related U.S. Application Data

(63) Continuation of application No. PCT/CN2019/071484, filed on Jan. 11, 2019.

(51) Int. Cl.
*H04W 74/0833* (2024.01)
(52) U.S. Cl.
CPC .............. *H04W 74/0833* (2013.01)
(58) Field of Classification Search
CPC .................................................. H04W 74/0833
See application file for complete search history.

(56) References Cited

U.S. PATENT DOCUMENTS

| | | |
|---|---|---|
| 2013/0044657 A1 | 2/2013 | Oh et al. |
| 2016/0105884 A1 | 4/2016 | Li et al. |
| 2021/0320747 A1* | 10/2021 | Yoshioka .............. H04L 1/0009 |

FOREIGN PATENT DOCUMENTS

| | | | |
|---|---|---|---|
| CN | 107135528 A | 9/2017 | |
| EP | 3205124 A1 | 8/2017 | |
| WO | 2016057248 A1 | 4/2016 | |
| WO | 2018/141265 A1 | 8/2018 | |
| WO | WO-2018175809 A1 * | 9/2018 | ........ H04W 36/0077 |
| WO | 2018204863 A1 | 11/2018 | |

OTHER PUBLICATIONS

International Search Report and Written Opinion dated Oct. 17, 2019 for International Application No. PCT/CN2019/071484, filed on Jan. 11, 2019 (7 pages).
European Search Report for EP Patent Application No. 19908459.1, dated Dec. 20, 2021, 8 pages.
Ericsson, "Small data transmission for inactive UEs," 3GPP TSG-RAN WG2 #95bis, R2-166922, Kaohsiung, Taiwan, Oct. 10-14, 2016, 7 pages.

* cited by examiner

*Primary Examiner* — Eric Myers
(74) *Attorney, Agent, or Firm* — Perkins Coie LLP

(57) ABSTRACT

Methods, systems, and devices for a two-step random access procedure in mobile communication technology are described. An exemplary method for wireless communication includes receiving, by a network node, a random access message that comprises at least one of a radio network temporary identifier (RNTI), an identity of the wireless device, an establishment cause, uplink control information (UCI) or beam information, and transmitting, to a wireless device, a contention resolution message, wherein at least a portion of the random access message is modulated using a first modulation scheme selected from a modulation group that comprises binary phase shift keying (BPSK) and π/2-BPSK.

20 Claims, 7 Drawing Sheets

US 11,974,324 B2

TWO-STEP RANDOM ACCESS PROCEDURE IN WIRELESS SYSTEMS

CROSS-REFERENCE TO RELATED APPLICATIONS

This application is a continuation of International Patent Application No. PCT/CN2019/071484, filed on Jan. 11, 2019, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring user equipment to implement a more efficient random access procedure.

SUMMARY

This document relates to methods, systems, and devices for a two-step random access procedure in mobile communication technology, including 5th Generation (5G) New Radio (NR) communication systems.

In one exemplary aspect, a wireless communication method is disclosed. The method includes transmitting, by a wireless device, a random access message that includes at least one of a radio network temporary identifier (RNTI), an identity of the wireless device, an establishment cause, uplink control information (UCI) or beam information, wherein at least a portion of the random access message is modulated using a first modulation scheme selected from a modulation group that includes binary phase shift keying (BPSK) and π/2-BPSK.

In another exemplary aspect, a wireless communication method is disclosed. The method includes receiving, by a network node, a random access message that includes at least one of a radio network temporary identifier (RNTI), an identity of the wireless device, an establishment cause, uplink control information (UCI) or beam information, and transmitting, to a wireless device, a contention resolution message, wherein at least a portion of the random access message is modulated using a first modulation scheme selected from a modulation group that includes binary phase shift keying (BPSK) and π/2-BPSK.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

There is an increasing demand for fourth generation of mobile communication technology (4G, the 4th Generation mobile communication technology), Long-Term Evolution (LTE), Advanced LTE (LTE-Advanced/LTE-A, Long-Term Evolution Advanced) and fifth-generation mobile communication technology (5G, the 5th Generation mobile communication technology). From the current development trend, 4G and 5G systems are studying the characteristics of supporting enhanced mobile broadband, ultra-high reliability, ultra-low latency transmission, and massive connectivity.

Figure 1:
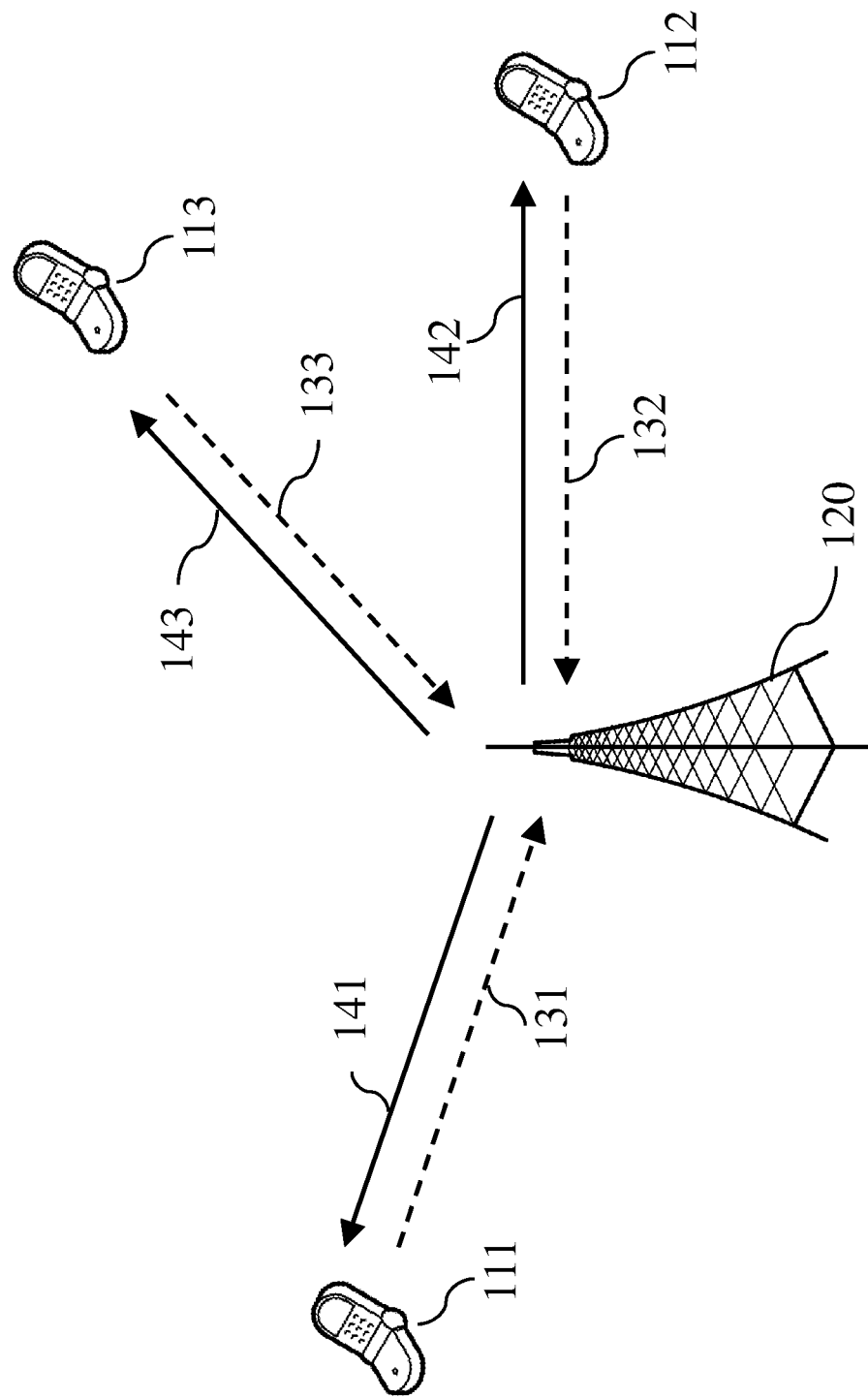
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G NR cellular network) that includes a BS 120 and one or more user equipment (UE) 111, 112 and 113. In some embodiments, the uplink transmissions (131, 132, 133) include MsgA and the downlink transmissions (141, 142, 143) include MsgB, as described by the presently disclosed technology. The UE may be, for example, a smartphone, a tablet, a mobile computer, a machine to machine (M2M) device, a terminal, a mobile device, an Internet of Things (IoT) device, and so on.

Figures 2, 3:
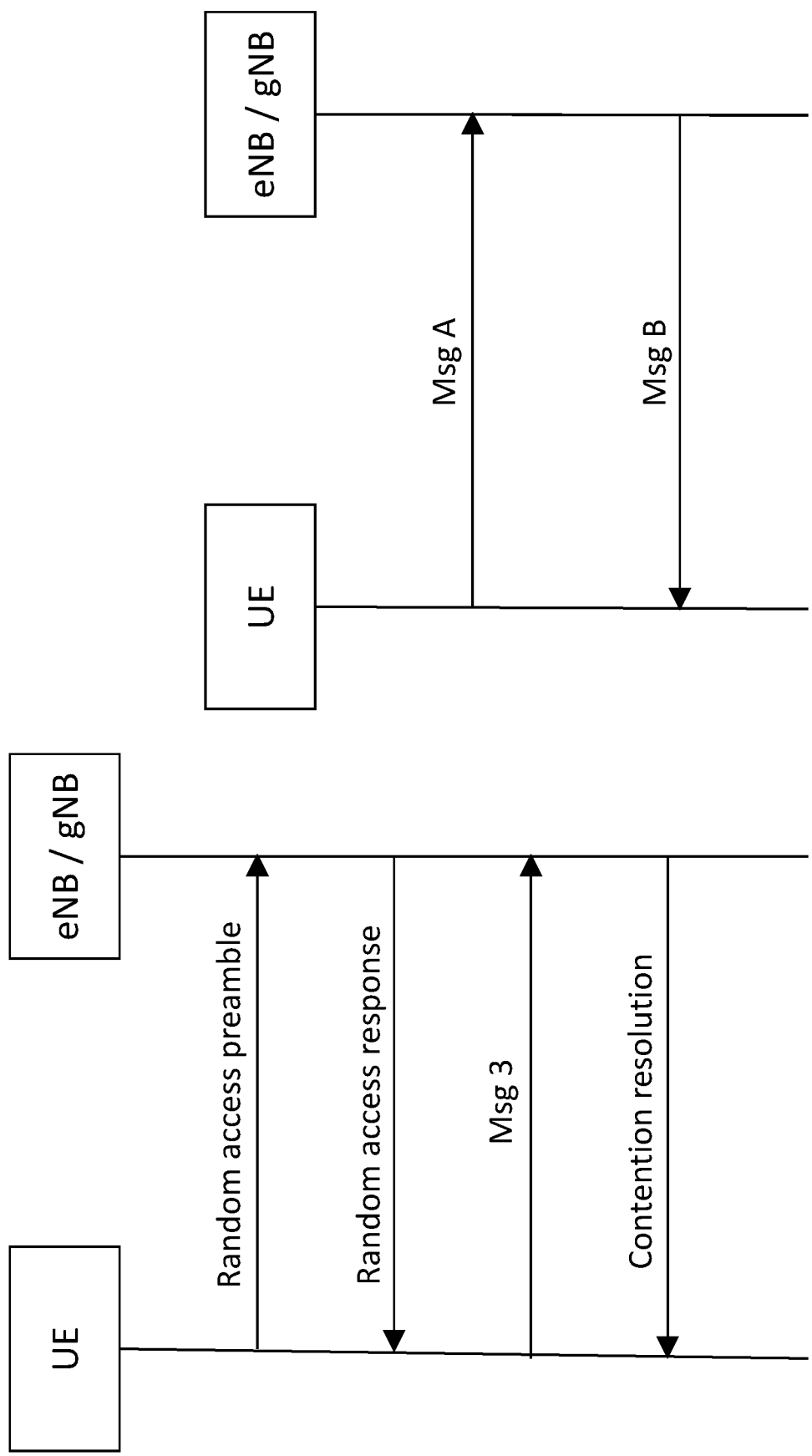
FIG. 2 shows an example of a four-step random access procedure.
FIG. 3 shows an example of a two-step random access procedure.

In the existing LTE and NR communication systems, an uplink transmission needs to enter the RRC connected state through a random access (RACH) process for subsequent data communication. An existing implementation of the contention-based random access procedure includes four steps, as shown in FIG. 2. As shown therein, the UE transmits a random access preamble over a physical random access channel (PRACH) occasion in a first step. In a second step, the UE obtains a timing according to the information sent over the DL-SCH by the network node (e.g., base station, eNB, gNB). In some embodiments, the timing may include a timing advance (TA), which may also be called a timing adjustment amount or an arrival delay difference amount. The UE further obtains, for example, an MCS indication, and a frequency hopping indication that is associated with the third step transmission information, e.g., the uplink transmission scheduling related to Msg3. The third step is to transmit Msg3 on a physical uplink shared channel (PUSCH) according to the timing adjustment information sent by the base station and the uplink data transmission scheduling information. In some embodiments, Msg3 includes information such as a connection request and a user identifier. In a fourth step, the UE receives a contention resolution message (referred to as Msg4) that is based on the user identification information (e.g., UE ID) received by the network node.

The Msg4 (including the user identifier and the random access request response message feedback) communication to the UE is based on the PRACH, which is a specific sequence selected from the PRACH resource pool that is configured for the base station, and wherein the UE randomly selects the PRACH transmission from the configured resource pool. In some cases, there may be two UEs that select the same PRACH occasion (time/frequency position and preamble index), and the base station is unable to distinguish two UEs during the PRACH detection process. Thus, in step four, base stations rely on the user ID carried in Msg3 in the third step to identify whether or not to allow users to access successfully; if the UEs do not receive feedback comprising information associated with their own identity from the base station, the random access procedure is deemed unsuccessful.

To simplify the signaling process, UE power consumption, and other factors, the four-step process described in FIG. 2 may be simplified to the two-step process shown in FIG. 3. In some embodiments, the random access preamble and Msg3 are merged into MsgA, and the contention resolution and some random access responses are similarly combined in MsgB. The content contained in the original messages (e.g., frequency hopping information, retransmission information, etc.) is merged into MsgB. For the Msg3 transmitted in MsgA, if the traditional 4-step random access process is followed, π/2-BPSK is a supported modulation and coding scheme in conjunction with the Discrete Fourier Transform spread orthogonal frequency multiplexing (DFT-S-OFDM) waveform. Using this modulation mode will result in the transmission waveform exhibiting excellent peak-to-average power ratio (PAPR) attributes.

However, in existing cyclic prefix OFDM (CP-OFDM) waveform implementations, BPSK or π/2-BPSK is not supported. Some of the advantages of using π/2-BPSK or BPSK modulation when the UE performs contention-based transmission include:

- The real and imaginary parts of the received signal can be split into two parts of the minimum mean squared error (MMSE) equation for the received signal, and the interference suppression for the received signal is stronger.
- Given the transport block size (TBSize) and the number of resource blocks (RBs), a larger range below the FEC encoder mother code rate can be obtained, therefore a greater degree of freedom for transmission can be obtained, for example, as follows:

| Payload Size (including CRC) | Modulation | Resource Allocation (in Resource Blocks) | Code Rate |
|---|---|---|---|
| 80 bits | QPSK | 1.5 RB | Same, 0.185, under the LDPC mother code rate |
| 80 bits | BPSK | 3 RB | |

- Demodulation of pi/2-BPSK and BPSK modulation is simpler than the demodulation of high-order modulations.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

EXEMPLARY EMBODIMENTS THE TWO-STEP RANDOM ACCESS PROCEDURE

Embodiment 1. In some embodiments, the UE transmits a transport block size (TBSize) of 56 bits, or 64 bits, or 72 bits, or 80 bits, or a 16-bit RNTI on the PUSCH of the MsgA in the two-step random access (2-step RACH) process.

In an example, the RRC configured TransformPrecoder is disabled, and information indicating that the UE uses BPSK, such as PUSCH-tp-BPSK, is configured. In this case, the UE shall use the CP-OFDM waveform for uplink transmission. Furthermore, if the first line of the MCS table is selected, BPSK modulation shall be adopted (e.g., the modulation order variable q=1). The UE receives the downlink broadcasting signal, and obtains information indicating the modulation mode from the received MIB/SIB/Paging information, for example, indicating that $I_{MCS}=0$, and acquiring information indicating the number of resource blocks (RBs) for transmission, such as 1, 2, or 3 RBs. When transmitting MsgA, the UE randomly selects the preamble sequence and determines the location of the corresponding PUSCH transmission resource block according to a certain mapping rule, the number of resource blocks for transmission could also be determined from a pre-defined mapping rule as described in Embodiments 3 and 4, and as shown in the examples in FIGS. 4-6.

In some embodiments, the UE selects the modulation and coding scheme (MCS) corresponding to the first line in the MCS table of, for example, Section 6.1.4.1 of the 3GPP Technical Specification (TS) 38.214, which is the entry with $I_{MCS}=0$. Since the RRC is configured, the UE adopts BPSK, and the modulation order variable (q=1) is transmitted by the UE using BPSK modulation.

Embodiment 2. In some embodiments, the UE transmits a transport block size (TBSize) on the PUSCH of MsgA in the process of 2-step RACH to 56 bits, or 64 bits, or 72 bits, or 80 bits, or a 16-bit RNTI.

In an example, the RRC configured TransformPrecoder is disabled, and information indicating that the UE uses π/2-BPSK, such as PUSCH-tp-pi/2-BPSK, is configured. In this case, the UE shall use the CP-OFDM waveform for uplink transmission. Furthermore, if the first line of the MCS table is selected, π/2-BPSK modulation shall be adopted (e.g., the modulation order variable q=1). The UE receives the downlink broadcasting signal, and obtains information indicating the modulation mode from the received MIB/SIB/Paging information, for example, indicating that $I_{MCS}=0$, and acquiring information indicating the number of resource blocks (RBs) for transmission, such as 1, 2, or 3 RBs. When transmitting MsgA, the UE randomly selects the preamble sequence and determines the location of the corresponding PUSCH transmission resource block according to a certain mapping rule, the number of resource blocks for transmission could also be determined from the pre-defined mapping rule as described in Embodiments 3 and 4, and as shown in the examples in FIGS. 4-6.

In some embodiments, the UE selects the modulation and coding scheme (MCS) corresponding to the first line in the MCS table of, for example, Section 6.1.4.1 of the 3GPP TS 38.214, which is the entry with $I_{MCS}=0$. Since the RRC is configured, the UE adopts π/2-BPSK, and the modulation order variable (q=1) is transmitted by the UE using π/2-BPSK modulation.

Embodiment 3. In some embodiments, the UE transmits a transport block size (TBSize) on the PUSCH of MsgA in the process of 2-step RACH to 56 bits, or 64 bits, or 72 bits, or 80 bits, or a 16-bit RNTI.

In an example, the RRC configured TransformPrecoder is disabled, and information indicating that the UE uses BPSK, such as PUSCH-tp-BPSK, is configured. In this case, the UE shall use the CP-OFDM waveform for uplink transmission. Furthermore, if the first line of the MCS table is selected, BPSK modulation shall be adopted (e.g., the modulation order variable q=1). The UE selects a modulation and coding mode according to the strength of the received downlink synchronization signal block (SSB) and the downlink reference signal RS, such as the magnitude of the reference signal received power (RSRP). For example, the selection is based on the rule that the larger the RSRP is, the higher the modulation order is. One example of the rule that may be implemented are as follows:

if $P_1 \geq RSRP \geq P_0$, use BPSK,
if $P_2 \geq RSRP > P_1$, use QPSK, and
if $P_3 \geq RSRP > P_2$, use 16-QAM.

Figure 5:
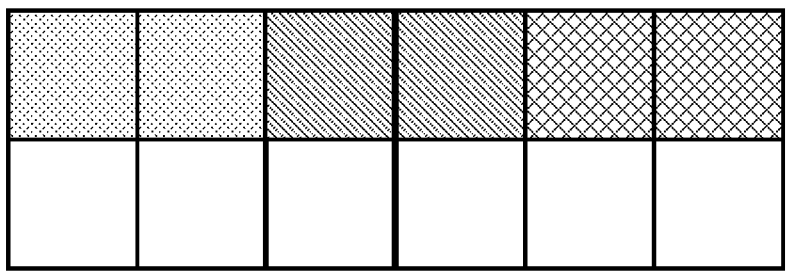
FIG. 5 shows another example of a channel structure of MsgA.
Figure 4:
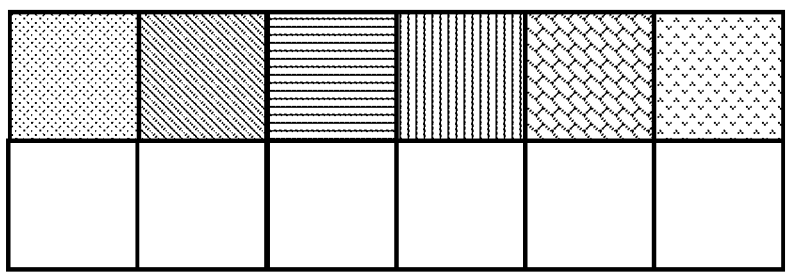
FIG. 4 shows an example of a channel structure of MsgA.
Figure 6:
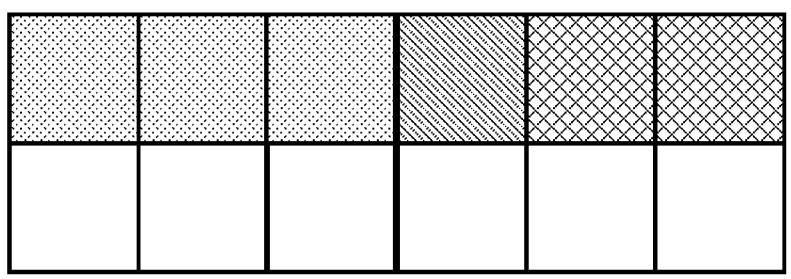
FIG. 6 shows yet another example of a channel structure of MsgA.

When transmitting MsgA, the UE randomly selects the preamble sequence and determines the position and number of the corresponding PUSCH transmission resource block according to a certain mapping rule, such as 1, 2 or 3 resource blocks (RBs), as shown in the examples in FIGS. 4-6. In some embodiments, the information of the coded modulation mode is reported to the base station by using 2 bits, and the modulation mode of the 2 bits is BPSK or pi/2-BPSK, and is determined by the received downlink MIB/SIB/paging information.

Embodiment 4. In some embodiments, the UE transmits a transport block size (TBSize) on the PUSCH of MsgA in the process of 2-step RACH to 56 bits, or 64 bits, or 72 bits, or 80 bits, or a 16-bit RNTI.

In an example, the RRC configured TransformPrecoder is disabled, and information indicating that the UE uses π/2-BPSK, such as PUSCH-tp-pi/2-BPSK, is configured. In this case, the UE shall use the CP-OFDM waveform for uplink transmission. Furthermore, if the first line of the MCS table is selected, π/2-BPSK modulation shall be adopted (e.g., the modulation order variable q=1). The UE selects a modulation and coding mode according to the strength of the received downlink synchronization signal block (SSB) and the downlink reference signal RS, such as the magnitude of the reference signal received power (RSRP). For example, the selection is based on the rule that the larger the RSRP is, the higher the modulation order is. One example of the rules that may be implemented are as follows:

if $P_1 \geq RSRP \geq P_0$, use π/2-BPSK,
if $P_2 \geq RSRP > P_1$, use QPSK, and
if $P_3 \geq RSRP > P_2$, use 16-QAM.

When transmitting MsgA, the UE randomly selects the preamble sequence and determines the position and number of the corresponding PUSCH transmission resource block according to a certain mapping rule, such as 1, 2 or 3 resource blocks (RBs), as shown in the examples in FIGS. 4-6. In some embodiments, the information of the coded modulation mode is reported to the base station by using 2 bits, and the modulation mode of the 2 bits is BPSK or pi/2-BPSK, and is determined by the received downlink MIB/SIB/paging information.

Embodiment 5. In some embodiments, the UE transmits a transport block size (TBSize) on the PUSCH of MsgA in the process of 2-step RACH to 56 bits, or 64 bits, or 72 bits, or 80 bits, or a 16-bit RNTI. The data of the PUSCH part is processed by a spreading technique after modulation. In an example, the spreading operation may be performed as follows. It is assumed that the k-th transmit symbol is $s_k$, and spreading with a spreading code of length $L \geq 1$ is performed as:

$$s_k \times [C_{k1}, C_{k2}, \ldots, C_{kL}] = [s_k C_{k1}, s_k C_{k2}, \ldots, s_k C_{kL}].$$

The information of the spreading code, such as the spreading code pool and the spreading code length, is determined by the downlink MIB/SIB/paging information.

Figure 7:
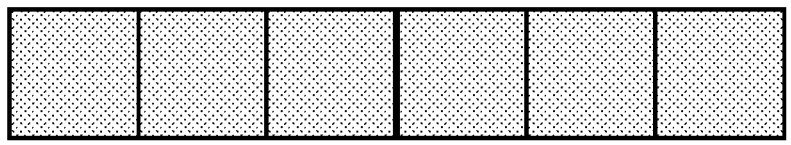
FIG. 7 shows yet another example of a channel structure of MsgA.

In some embodiments, the transmitted data may include the information associated with the spreading code (e.g., the index of the spreading code in a code set, information related to the generation of the spreading code). In an example, and as shown in FIG. 7, only the payload may be transmitted (with no preamble or pilot data). Thus, in these scenarios, if the transmitted data includes the information of the spreading code or the index of the spreading code in a code set or the information of the generation of the spreading code, the spreading code can be used to generate a precise reconstruction of the spread data symbols and assist in blind detection. On the receiver side, blind detection and decoding may be used to decode the PUSCH or PUCCH by first combining the signals received on the multiple antennas. In an example, the beam used for combining could loop through a pre-defined beam pool.

Embodiment 6. In some embodiments, beam determination in contention-based uplink PUSCH or PUCCH transmissions may be performed in a blind manner. In an example, beam determination in a contention-based uplink PUSCH could be performed in a blind manner by looping through a pre-defined beam pool.

Examples of pre-defined beam pools, in the case of 4 antenna ports and 2 antenna ports, are shown in Tables 1-3. In some embodiments, and to alleviate decoding efforts, the streams with the larger post-SINR could be fed to the FEC decoder.

TABLE 1

Example of beam vectors for 4 receive antenna ports

| Beam Index | Beam Vector $v_4 \in \mathbb{C}^{1 \times 4}$ | | | |
|---|---|---|---|---|
| 1 | 1 | 1 | 0 | 0 |
| 2 | 1 | −1 | 0 | 0 |
| 3 | 1 | 0 | 1 | 0 |
| 4 | 1 | 0 | −1 | 0 |
| 5 | 1 | 0 | 0 | 1 |
| 6 | 1 | 0 | 0 | −1 |
| 7 | 0 | 1 | 1 | 0 |
| 8 | 0 | 1 | −1 | 0 |
| 9 | 0 | 1 | 0 | 1 |
| 10 | 0 | 1 | 0 | −1 |
| 11 | 0 | 0 | 1 | 1 |
| 12 | 0 | 0 | 1 | −1 |
| 13 | 1 | i | 0 | 0 |
| 14 | 1 | −i | 0 | 0 |
| 15 | 1 | 0 | i | 0 |
| 16 | 1 | 0 | −i | 0 |

TABLE 1-continued

Example of beam vectors for 4 receive antenna ports

| Beam Index | Beam Vector $v_4 \in C^{1\times 4}$ | | | |
|---|---|---|---|---|
| 17 | 1 | 0 | 0 | i |
| 18 | 1 | 0 | 0 | −i |
| 19 | 0 | 1 | i | 0 |
| 20 | 0 | 1 | −i | 0 |
| 21 | 0 | 1 | 0 | i |
| 22 | 0 | 1 | 0 | −i |
| 23 | 0 | 0 | 1 | i |
| 24 | 0 | 0 | 1 | −i |

TABLE 2

Example of beam vectors for 4 receive antenna ports

| Beam Index | Beam Vector $v_4 \in C^{1\times 4}$ | | | |
|---|---|---|---|---|
| 1 | 1 | 1 | 1 | 1 |
| 2 | 1 | −1 | 1 | −1 |
| 3 | 1 | 1 | −1 | −1 |
| 4 | 1 | −1 | −1 | 1 |
| 5 | 1 | −i | −i | 1 |
| 6 | 1 | i | i | −1 |
| 7 | 1 | −i | −i | −1 |
| 8 | 1 | i | −i | 1 |
| 9 | 1 | −1 | −i | −i |
| 10 | 1 | 1 | −i | i |
| 11 | 1 | −1 | i | i |
| 12 | 1 | 1 | i | −i |
| 13 | 1 | i | −1 | i |
| 14 | 1 | −i | −1 | −i |
| 15 | 1 | i | 1 | −i |
| 16 | 1 | −i | 1 | i |

TABLE 3

Example of beam vectors for 2 receive antenna ports

| Beam Index | Beam Vector $v_2 \in C^{1\times 2}$ | |
|---|---|---|
| 1 | 1 | 0 |
| 2 | 0 | 1 |
| 3 | 1 | 1 |
| 4 | 1 | −1 |
| 5 | 1 | i |
| 6 | 1 | −i |

Exemplary Methods for the Disclosed Technology

Embodiments of the disclosed technology advantageously result in, among other features, more efficient signaling and reduces UE power consumption. In some embodiments, the presently disclosed technology may be characterized by the following features:

In the two-step random access (2-step RACH) process, when the UE transmits the PUSCH of the MsgA, if the CP-OFDM waveform is used for transmission, pi/2-BPSK or BPSK modulation may be selected.

The transmission content of the PUSCH of MsgA may include RNTI (e.g., C-RNTI, RA-RNTI), UE identity (e.g., IMSI, S-TMSI, ng-5G-S-TMSI-Part1), an RRC reason for establishment (e.g., mobile terminating access, mobile terminal access), or UCI.

The UE configures the UE to use pi/2-BPSK modulation through PUSCH-tp-pi/2-BPSK when the upper layer configures the parameter transformPrecoder to be disabled.

The UE configures the UE to use BPSK modulation through PUSCH-tp-BPSK when the upper layer configures the parameter transformPrecoder to be disabled.

The UE obtains the modulation mode of the PUSCH of the MsgA by using the MIB transmitted in the PBCH or the SIB transmitted in the PDSCH and the paging information transmitted in the PCH or the PDSCH, including the pi/2-BPSK, BPSK modulation mode.

The UE autonomously selects a modulation scheme including pi/2-BPSK, BPSK, and optionally, informs the base station of the selected modulation scheme by means of 2 bits. For these 2 bits, modulation is performed using pi/2-BPSK or BPSK.

The criterion for the UE autonomously selecting the modulation mode may include the strength of the SS-Block or the downlink RS (for example, RSRP).

The possible process for selecting the strength according to SS-Block or downlink RS may be as follows:
If $P_1 \geq RSRP \geq P_0$, use BPSK or $\pi/2$-BPSK
If $P_2 \geq RSRP > P_1$, use QPSK
If $P_3 \geq RSRP > P_2$, use 16-QAM For BPSK or $\pi/2$-BPSK, the UE can determine which one to use by using the information obtained by the received MIB/SIB/paging.

The modulated data is further applied to a spreading technique.

Figure 8:
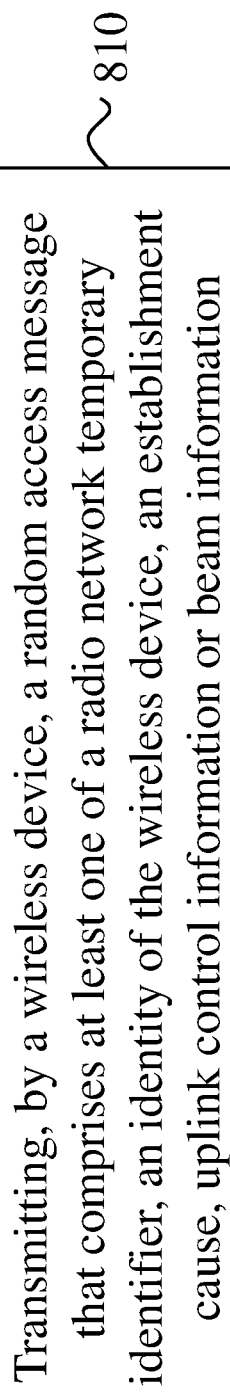
FIG. 8 is a flowchart of an example of a wireless communication method.

FIG. 8 shows an example of a wireless communication method 800 for a two-step random access procedure in mobile communication technology. The method 800 includes, at step 810, transmitting, by a wireless device, a random access message that comprises at least one of a radio network temporary identifier (RNTI), an identity of the wireless device, an establishment cause, uplink control information (UCI) or beam information. In some embodiments, at least a portion of the random access message is modulated using a first modulation scheme selected from a modulation group that comprises binary phase shift keying (BPSK) and $\pi/2$-BPSK.

In some embodiments, the method 800 further includes the step of receiving, from a network node and in response to transmitting the random access message, a contention resolution message.

In some embodiments, a precoder parameter is disabled, and a modulation parameter configures the first modulation scheme or the second modulation scheme to be $\pi/2$-BPSK. For example, the precoder parameter is transformPrecoder that is configured by Layer 2 signaling, and the modulation parameter is PUSCH-tp-pi/2-BPSK that is configured by a cellular network.

In some embodiments, a precoder parameter is disabled, and a modulation parameter configures the first modulation scheme or the second modulation scheme to be BPSK. the precoder parameter is transformPrecoder that is configured by Layer 2 (L2) signaling, and the modulation parameter is PUSCH-tp-BPSK that is configured by a cellular network.

In some embodiments, the first or second modulation scheme is configured based on a master information block (MIB) in a physical broadcast channel (PBCH).

In some embodiments, the first or second modulation scheme is configured based on a system information block (SIB) in a physical downlink shared channel (PDSCH) and paging information in the PDSCH or a physical channel (PCH). In an example, the first modulation scheme or the second modulation scheme is configured using a 4-bit field or a 5-bit field.

In some embodiments, the first or second modulation scheme is selected based on a reference signal received power (RSRP) of a downlink reference signal or a synchronization signal (SS) block, and wherein the second modulation scheme is selected from one of BPSK, π/2-BPSK, quadrature phase shift keying (QPSK) or 16-QAM (quadrature amplitude modulation). In an example, the portion of the random access message is a 2-bit field indicative of first modulation scheme or the second modulation scheme, respectively. In another example, the first modulation scheme or the second modulation scheme is selected as follows:

if $P_1 \geq RSRP \geq P_0$, use BPSK or π/2-BPSK,
if $P_2 \geq RSRP > P_1$, use QPSK, and
if $P_3 \geq RSRP > P_2$, use 16-QAM.

Herein, $P_0$, $P_1$, $P_2$ and $P_3$ are pre-determined thresholds.

Figure 9:
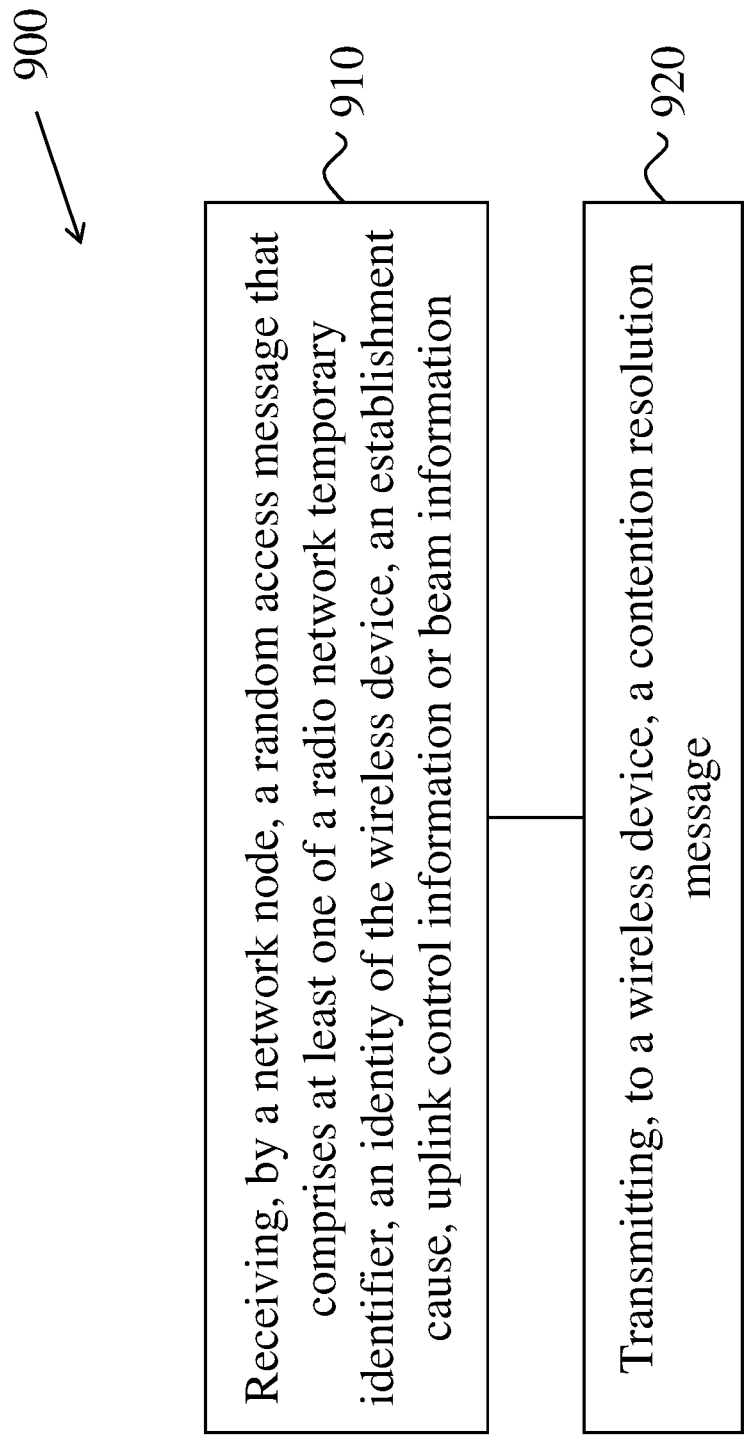
FIG. 9 is a flowchart of another example of a wireless communication method.

FIG. 9 shows another example of a wireless communication method 900 for a two-step random access procedure in mobile communication technology. This example includes some features and/or steps that are similar to those shown in FIG. 800, and described above. At least some of these features and/or steps may not be separately described in this section.

The method 900 includes, at step 910, receiving, by a network node, a random access message that comprises at least one of a radio network temporary identifier (RNTI), an identity of the wireless device, an establishment cause, uplink control information (UCI) or beam information (e.g., information related to the downlink beams transmitted by the base station and acquired by the UE). In some embodiments, at least a portion of the random access message is modulated using a first modulation scheme selected from a modulation group that comprises binary phase shift keying (BPSK) and π/2-BPSK. In other embodiments, a remainder of the random access message is modulated using a second modulation scheme selected from the modulation group.

The method 900 includes, at step 920, transmitting, to a wireless device, a contention resolution message.

In some embodiments, and in the context of methods 800 and 900, communicating the contention resolution message completes a two-step random access procedure between the wireless device and the network node.

In some embodiments, the modulation group further comprises quadrature phase shift keying (QPSK) and 16-QAM (quadrature amplitude modulation).

In some embodiments, the RNTI comprises a cell radio network temporary identifier (C-RNTI) or a random access radio network temporary identifier (RA-RNTI).

In some embodiments, the identity of the wireless device comprises at least one of an international mobile subscriber identity (IMSI), a serving temporary mobile subscriber identity (S-TMSI), a ng-5G-S-TSMI-Part1 field, or a random number.

In some embodiments, the establishment cause is a mobile originating signal or data.

In some embodiments, the UCI comprises at least one of a scheduling request, a channel state indicator, a modulation and coding scheme (MCS) indicator, a hybrid automatic repeat request (HARQ) acknowledgement (ACK), a buffer status report (BSR), a beam index of the wireless device, a beam index of the network node, a power headroom report (PHR), beam measurement results or a beam failure indication.

In some embodiments, the beam information comprises a beam index of the wireless device or a beam index of the network node. In an example, the beam index is an index of a synchronization signal block (SSB) with a strongest receive reference signal received power (RSRP) of a plurality of SSBs.

In some embodiments, the random access message and the contention resolution message are communicated using a cyclic prefix orthogonal frequency division multiplexing (CP-OFDM) waveform. In other embodiments, the random access message is communicated using a discrete Fourier transform (DFT)-spread orthogonal frequency division multiplexing (DFT-S-OFDM) waveform, and the contention resolution message is communicated using a cyclic prefix OFDM (CP-OFDM) waveform.

Implementations for the Disclosed Technology

In some embodiments, the presently disclosed technology may include the incorporation of the following underlined portion into Section 6.1.4.1 of the 3GPP Technical Specification 38.214:

. . . if transform precoding is disabled for this PUSCH transmission according to Subclause 6.1.3

. . .

else the UE shall use $I_{MCS}$ and Table 5.1.3.1-1 to determine the modulation order (Qm) and target code rate (R) used in the physical uplink shared channel except for MsgA PUSCH, the UE shall use $I_{MCS}$ and table 6.1.4.1-1 would be used to determine the modulation order (Qm) and target code rate (R) used in the physical uplink shared channel.

Figure 10:
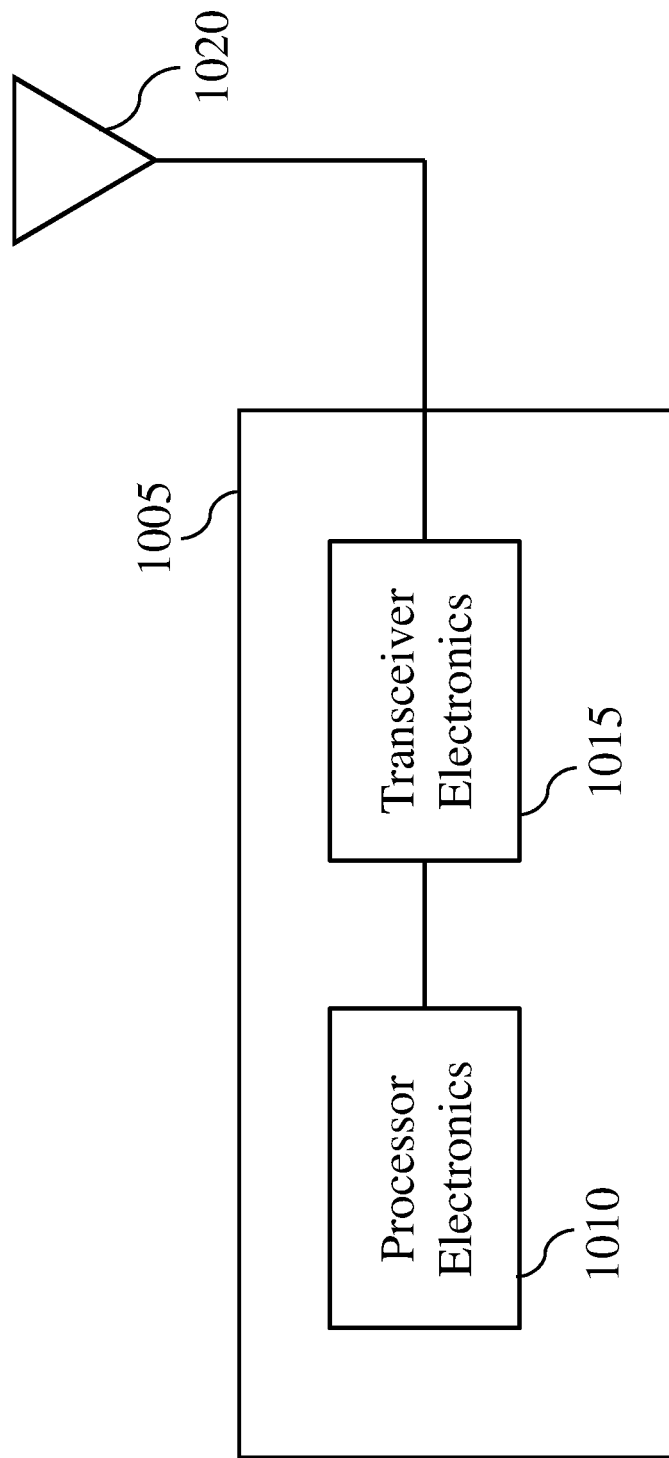
FIG. 10 is a block diagram representation of a portion of an apparatus, in accordance with some embodiments of the presently disclosed technology.

FIG. 10 is a block diagram representation of a portion of an apparatus, in accordance with some embodiments of the presently disclosed technology. An apparatus 1005, such as a base station or a wireless device (or UE), can include processor electronics 1010 such as a microprocessor that implements one or more of the techniques presented in this document. The apparatus 1005 can include transceiver electronics 1015 to send and/or receive wireless signals over one or more communication interfaces such as antenna(s) 1020. The apparatus 1005 can include other communication interfaces for transmitting and receiving data. Apparatus 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the apparatus 1005.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
receiving, by a wireless device from a network node, a signaling that configures a precoder parameter to be disabled and a data transmission through one or more channels;
obtaining, based on the data transmission, information indicating a modulation mode that is selected from a modulation group that comprises binary phase shift keying (BPSK) and π/2-BPSK;
transmitting, by the wireless device, a random access message that comprises at least one of a radio network temporary identifier, RNTI, an identity of the wireless device, an establishment cause, uplink control information, UCI, or beam information; and
receiving, from the network node and in response to transmitting the random access message, a contention resolution message,
wherein communicating the contention resolution message completes a two-step random access procedure between the wireless device and the network node, and
wherein at least a first portion of the random access message is modulated using a first modulation scheme selected from the modulation group to be BPSK or π/2-BPSK based on the modulation mode included in the information.

2. The method of claim 1, wherein a second portion of the random access message is modulated using a second modulation scheme.

3. The method of claim 2, wherein the precoder parameter is disabled, and wherein a modulation parameter configures the first modulation scheme or the second modulation scheme to be π/2-BPSK.

4. The method of claim 3, wherein the precoder parameter is transformPrecoder that is configured by Layer 2 (L2) signaling, and wherein the modulation parameter is PUSCH-tp-pi/2-BPSK that is configured by the network node that is a cellular network.

5. The method of claim 2, wherein the precoder parameter is disabled, and wherein a modulation parameter configures the first modulation scheme or the second modulation scheme to be BPSK.

6. The method of claim 5, wherein the precoder parameter is transformPrecoder that is configured by Layer 2 (L2) signaling, and wherein the modulation parameter is PUSCH-tp-BPSK that is configured by the network node that is a cellular network.

7. The method of claim 2, wherein the first modulation scheme or the second modulation scheme is configured based on a master information block (MIB) in a physical broadcast channel (PBCH).

8. The method of claim 2, wherein the first modulation scheme or the second modulation scheme is configured based on a system information block (SIB) in a physical downlink shared channel (PDSCH) and paging information in the PDSCH or a physical channel (PCH).

9. The method of claim 8, wherein the first modulation scheme or the second modulation scheme is configured using a 4-bit field or a 5-bit field.

10. The method of claim 2, wherein the first modulation scheme or the second modulation scheme is selected based on a reference signal received power (RSRP) of a downlink reference signal or a synchronization signal (SS) block, and wherein the second modulation scheme is selected from one of BPSK, π/2-BPSK, quadrature phase shift keying (QPSK) or 16-QAM (quadrature amplitude modulation).

11. The method of claim 10, wherein the random access message has a 2-bit field indicative of the first modulation scheme or the second modulation scheme, and wherein the second modulation scheme is selected as follows:
if $P_1 \geq RSRP \geq P_0$, use BPSK or π/2-BPSK,
if $P_2 \geq RSRP \geq P_1$, use QPSK, and
if $P_3 \geq RSRP \geq P_2$, use 16-QAM, and
wherein $P_0$, $P_1$, $P_2$ and $P_3$ are pre-determined thresholds.

12. A method for wireless communication, comprising:
transmitting, by a network node to a wireless device, a signaling that configures a precoder parameter to be disabled and a data transmission through one or more channels, the data transmission including information indicating a modulation mode that is selected from a modulation group that comprises binary phase shift keying (BPSK) and π/2-BPSK;

receiving, by the network node, a random access message that comprises at least one of a radio network temporary identifier (RNTI), an identity of the wireless device, an establishment cause, uplink control information (UCI) or beam information; and transmitting, to the wireless device, a contention resolution message, wherein communicating the contention resolution message completes a two-step random access procedure between the wireless device and the network node, and wherein at least a first portion of the random access message is modulated using a first modulation scheme selected from the modulation group to be BPSK or π/2-BPSK based on the modulation mode included in the information.

13. The method of claim 12, wherein the modulation group further comprises quadrature phase shift keying (QPSK) and 16-QAM (quadrature amplitude modulation).

14. The method of claim 12, wherein the RNTI comprises a cell radio network temporary identifier (C-RNTI) or a random access radio network temporary identifier (RA-RNTI).

15. The method of claim 12, wherein the identity of the wireless device comprises at least one of an international mobile subscriber identity (IMSI), a serving temporary mobile subscriber identity (S-TMSI), a ng-5G-S-TSMI-Part1 field, or a random number.

16. The method of claim 12, wherein the establishment cause is a mobile originating signal or data.

17. The method of claim 12, wherein the UCI comprises at least one of a scheduling request, a channel state indicator, a modulation and coding scheme (MCS) indicator, a hybrid automatic repeat request (HARQ) acknowledgement (ACK), a buffer status report (BSR), a beam index of the wireless device, a beam index of the network node, a power headroom report (PHR), beam measurement results or a beam failure indication, and wherein the beam information comprises the beam index of the wireless device or the beam index of the network node.

18. The method of claim 17, wherein the beam index is an index of a synchronization signal block (SSB) with a strongest receive reference signal received power (RSRP) of a plurality of SSBs.

19. The method of claim 12, wherein the random access message and the contention resolution message are communicated using a cyclic prefix orthogonal frequency division multiplexing (CP-OFDM) waveform.

20. The method of claim 12, wherein the random access message is communicated using a discrete Fourier transform (DFT)-spread orthogonal frequency division multiplexing (DFT-S-OFDM) waveform, and wherein the contention resolution message is communicated using a cyclic prefix OFDM (CP-OFDM) waveform.

* * * * *